United States Patent [19]

Johannes

[11] Patent Number: 5,056,486
[45] Date of Patent: Oct. 15, 1991

[54] COMBUSTION ENGINE

[76] Inventor: Nicholas J. Johannes, Rothstrasse 30, CH-8042 Zurich, Switzerland

[21] Appl. No.: 543,722
[22] PCT Filed: Oct. 20, 1989
[86] PCT No.: PCT/CH89/00186
  § 371 Date: Jul. 18, 1990
  § 102(e) Date: Jul. 18, 1990
[87] PCT Pub. No.: WO90/05842
  PCT Pub. Date: May 31, 1990

[30] Foreign Application Priority Data

Nov. 18, 1988 [CH] Switzerland ............... 4298/88

[51] Int. Cl.$^5$ ............................................. F02B 15/00
[52] U.S. Cl. ................................. 123/432; 123/52 M; 123/188 M
[58] Field of Search ............ 123/432, 308, 188 M, 123/65 VD, 52 M

[56] References Cited

U.S. PATENT DOCUMENTS

| | | | |
|---|---|---|---|
| 2,804,862 | 9/1957 | Nedwidek | 123/432 |
| 3,211,137 | 10/1965 | Love | 123/432 |
| 3,331,361 | 7/1967 | Baudry | 123/432 |
| 3,412,552 | 11/1968 | Elsbett | 123/188 M |
| 4,271,795 | 6/1981 | Nakagawa et al. | 123/188 M |
| 4,548,175 | 10/1985 | Kawai et al. | 123/432 |
| 4,612,903 | 9/1986 | Urabe et al. | 123/432 |
| 4,614,174 | 9/1986 | Tanigawa | 123/432 |
| 4,617,896 | 10/1986 | Yoshikawa | 123/432 |
| 4,627,400 | 12/1986 | Takata et al. | 123/432 |
| 4,840,147 | 6/1989 | Tanahashi et al. | 123/65 VD |

FOREIGN PATENT DOCUMENTS 3600408 7/1987 Fed. Rep. of Germany .
99026 6/1984 Japan .................. 123/308

Primary Examiner—E. Rollins Cross
Attorney, Agent, or Firm—Watson, Cole, Grindle & Watson

[57] ABSTRACT

A multivalve internal combustion engine uses multiple inlet ports (2,3), each having a separate throttle (6), a fuel injection (7) and an intake valve (5). The individual inlet ports are positioned in such a way that they join the cylinderhead essentially in the same circumferential direction, thereby achieving a continuous unidirectional whirl in the cylinder at all engine speeds and loads. At low engine speeds, only one inlet port is opened; further inlet ports are opened progressively. The diameter of the inlet ports differ in size, whereby the first opened inlet port generates the fastest gas speed and the subsequent inlet ports generate successively slower gas speeds. Achieving an uninterrupted continuous strong whirl turbulence in the cylinder throughout the engine speed range, results in overall higher maximum power output, a clean fast burn and optimum torque characteristics using variable gas column adjustments.

3 Claims, 2 Drawing Sheets

COMBUSTION ENGINE

BACKGROUND OF THE INVENTION

This invention concerns an internal combustion engine with at least one exhaust valve and more than one inlet valve per cylinder, as well as a mechanism for operating the valves separately.

The power of a combustion engine rises with an increase in cylinder capacity and revolutions per minute (rpm). However, with a large capacity, the oscillating mass of the big pistons limits high rpm. Therefore, high powered engines use multiple, smaller cylinders designed for high rpm, but subsequently suffer a loss of torque at lower rpm.

For an elastic engine characteristic with strong torque the intake ports are narrow and long, whereas for maximum power they should be relatively short and wide. In order to optimize the gas exchange in the cylinder for the best engine performance at high and low rpm, several solutions have been proposed with limited success, such as variable length intake ports, the semi-closure of a double barrel carburetor or the disengagement of the valve lifters at partial power loads.

Another proposal on this subject is the variable valve timing with which at different rpm the valve lift time and height can be regulated, thus changing the valve overlapping timings. Overlapping timings between the exhaust valve closure and the inlet valve opening have been standard engineering for a long time, whereby the mass of the escaping exhaust gas column generates a tiny vacuum in the exhaust port. As the inlet valve is opened early, this vacuum sucks the slightly pressurized fresh gas column into movement, resulting in an overall higher cylinder filling grade. The longer the distance between the exhaust valve and the inlet valve, the earlier the inlet valve can be opened without fresh gas escaping through the exhaust port. This circumstance has not yet been exploited to the fullest in multivalve engines.

The overlapping times of existing multivalve engines are very short because the synchronously opening inlet valves are close to the opposite facing exhaust valves. The advantage lies in the smaller size of the valves which are therefore lighter, enabling higher rpm. Also the circumference of multiple valves is bigger than with a single, even larger valve, enabling a higher gasflow. A single inlet valve engine has the advantage that through placing the valve out of the center of the cylinder axis, a very desirable, unidirectional whirl is created by the inflowing gas, resulting in a higher filling grade and a quicker, smoother burn of the gas. This advantage is lost with multivalve engines because gas flowing through the side-by-side valves tends to form a rolling collision turbulence, causing slower and irregular burn patterns at various, especially high rpm, resulting in spontaneous detonation. A desirable unidirectional whirl can be achieved with multivalve engines at partial power when one of the intake ports is closed; but as soon as the adjacent port is opened for power increase, the whirl collapses and changes into an aforesaid collision turbulence.

Furthermore, present high performance use long valve shafts order to direct the intake ports as straight as possible to the inlet valves so that the gas flows at a steep angle past the valve evenly around the opening gap. However, this induces a small vortex beneath each valve which again disturbs the desirably even swirl within the cylider. Furthermore, with longer valve shafts the oscillating mass rises, which is contrary to the aim of attaining high rpm.

SUMMARY OF THE INVENTION

The object of the herewith presented invention is the design of a multivalve engine where the intake gas flow is controlled in such a way that an even unidirectional swirl into the cylinder is achieved at any given engine speed, thereby enhancing the filling grade with a subsequent power increase, thereby also aided by long overlapping times between the exhaust and inlet valves. This even unidirectional turbulence attains a fast, clean burn of the gas particles which delay spontaneous detonation, achieving higher rpm for maximum power output; however, the engine also has strong torque characteristics at low rpm. And in respect of reaching high rpm through light mass, the valves are kept relatively short.

In the preferred construction of the cylinderhead multiple, separate intake ports, at least one port joins the cylinderhead essentially from the top and at least one port joins at an angle from the side; whereby every further port joining either from the top or from the side is positioned in the same circumferential direction, so that a continuous unidirectional gas whirl is achieved in the cylinder. Therefore two, three or even four intake ports per cylinder can be utilized which are spread essentially at the same angle intervals around the cylinderhead. It is possible to place two intake ports leading to the cylinderhead from the top and two intake ports leading at an angle from the side, but, they always join the cylinderhead in a more or less equivalent distinct circumferential direction so that the gas flow enters the cylinder in a uniform swirling manner, thus creating the desired turbulence.

Because every intake port has its own independent but interacting air throttle and fuel supply, the carburation is optimized and permits the realization of running the engine according to the procedure of this invention; whereas for low rpm at least one intake, port is opened via its throttle and during an increase in rpm the other intake ports open via their individual throttles respectively at set intervals.

In order to achieve a maximum valve overlapping time the engine operates with different valve overlapping timings between the intake and exhaust, whereby the first opening inlet valve has the longest overlapping time with the furthest positioned, latest closing exhaust valve.

There can be a provision for one or also two exhaust valves per cylinder, though for each cylinder row the exhaust ports are located on the same side. Known multivalve engines with whirl characteristics have, if seen from above, intake and exhaust ports in a crossover position for each cylinder, creating an intricate construction.

In a practical development, the intake ports have different sized cross-sections in order to generate different gas speeds. As the rpm build up, the individual inlet ports with gradually lower gas speeds are opened additionally in sequence. This optimizes the gas flow into the cylinder at various piston stroke positions and stroke speeds and the gas swirl does not decelerate even at maximum piston stroke. The combined results of the aggregation of individual variable ports are high peak power with excellent torque characteristics.

Further details and advantages of the invention will become from the following description, with reference to the accompanying drawings, which describe the invention purely by way of example.

DETAILED DESCRIPTION OF THE PREFERRED EMBODIMENTS

Figure 1:
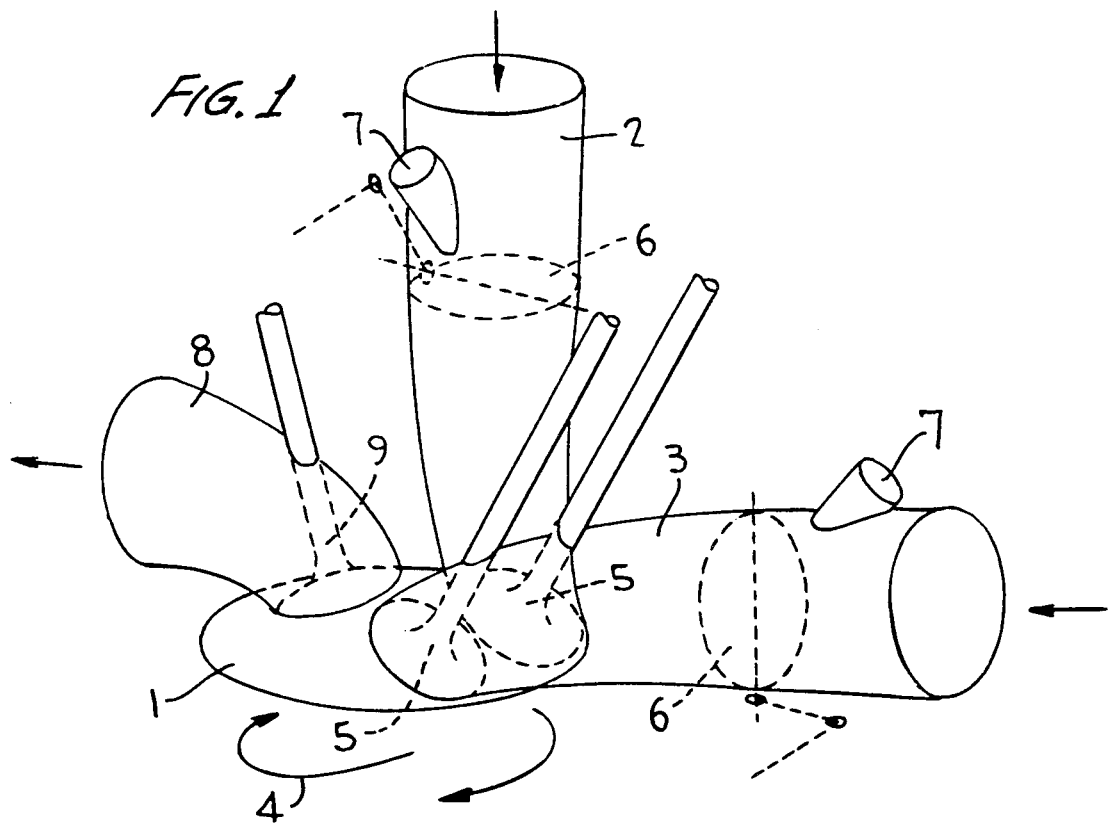
FIG. 1 schematic and diagrammatic presentation of a three-valve is a cylinderhead with appertaining ports.

According to FIG. 1, a first intake port (2) joins the cylinderhead (1) of a combustion engine cylinder (not shown) essentially from the top and a second intake port (3) joins at a slanting angle from the side while pointing into a circumferential direction, so that the gas flow enters the cylinder in the form of a whirl shown by the arrows (4). Both intake ports are closed by valves (5). Furthermore, each intake port has a throttle (6) and a fuel supply (7) which interact together. The amount of fuel supply depends on the position of the air throttle. At low rpm the throttle of only one inlet port is opened, at higher rpm the second one opens in addition.

Opposite to the intake ports (2) and (3) an exhaust port (8) is located with an exhaust valve (9). The valve heads of the inlet valves (5) and the valve head of exhaust valve (9) lie slanted at an angle in relation to the cylinder head. This arrangement is advantagous for the gas flow direction, whereas the slanted inlet valve heads guide the gas flow in such a manner that it enters the cylinder in the form of a whirl. Therefore, the intake ports do not have to be directed steeply towards the valve heads, enabling the valves to be kept shorter and therefore lighter, which results in higher rpm and a compact cylinder head size.

Figure 2:
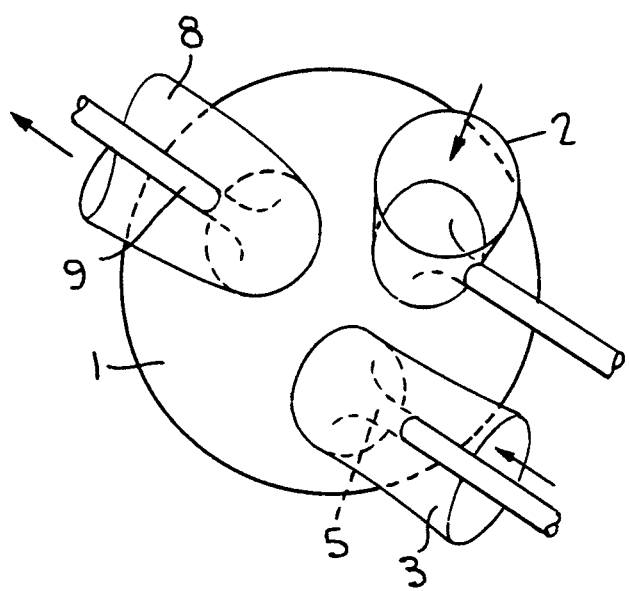
FIG. 2 is a view from the top of the cylinderhead as shown in FIG. 1, without throttles and injections.
Figure 3:
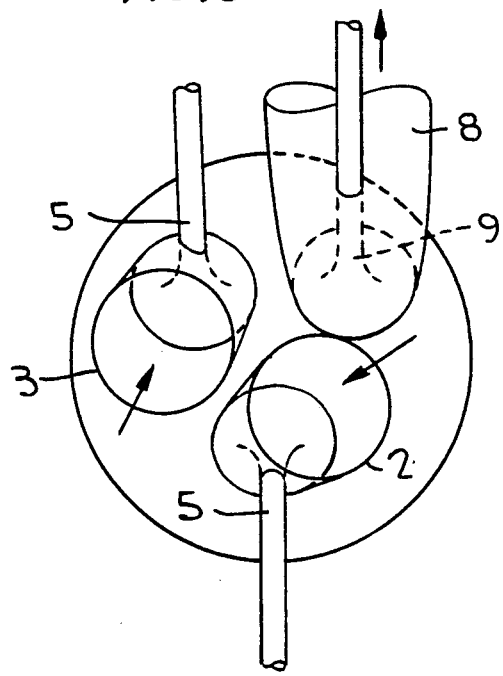
FIG. 3 is a view from the top of a schematic three-valve cylinderhead with a different configuration of the valves and ports.

It is also apparent in FIGS. 1 and 2 that the valves which stand at an angle to each other are activated by two overhead camshafts, not shown here.

The same principle detailed in FIGS. 1 and 2 applies to the other arrangements shown in FIG. 3-6, whereas to simplify the illustration the throttles and fuel supplies in the intake ports have been omitted. The arrangement in FIG. 3 differs from the earlier described one in that both intake ports essentially join the cylinder head from the top whereby one inlet valve and on exhaust valve are located side by-side and are activated by the same camshaft and the second inlet valve is located opposite and activated by a separate camshaft.

Figure 4:
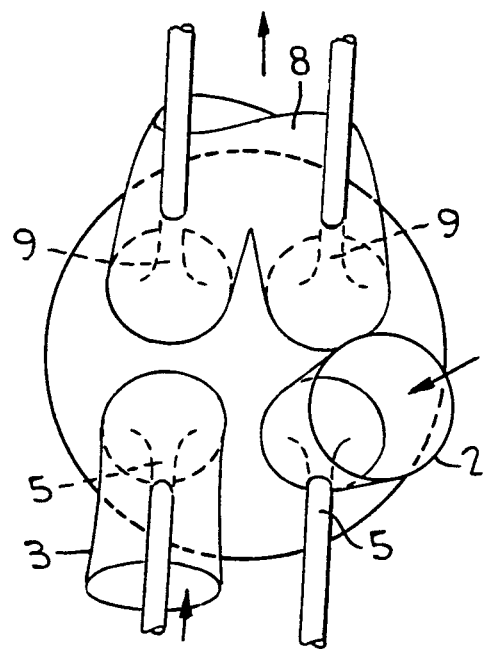
FIG. 4 is a view from the top of a schematic four-valve cylinderhead.

For the arrangement in FIG. 4 two exhaust valves use a joint exhaust port (8a). With two exhaust valves, one closes later than the other. If, for instance the left exhaust valve (9) in FIG. 4 closes later, then the intake port (2) has an earlier valve opening timing because it is the furthest from the last closing exhaust valve (9). This enables longer valve overlapping times.

Figure 5:
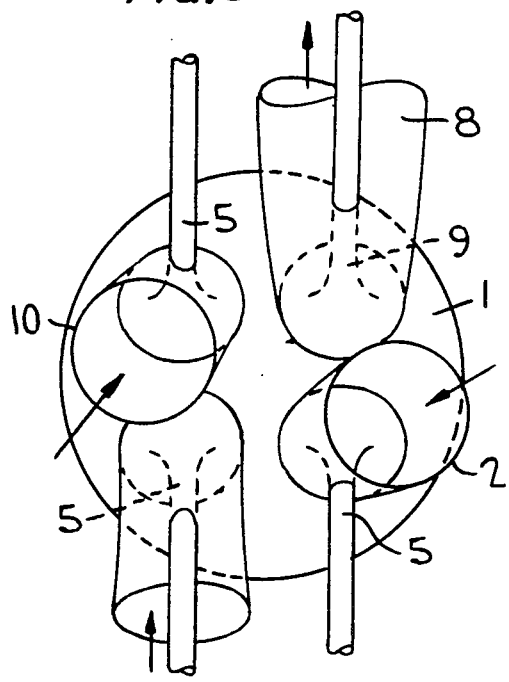
FIG. 5 is a view from the top of a schematic four-valve cylinderhead with a different configuration of the valves and FIG. 6 is a view from the top of a schematic five-valve cylinderhead.

The arrangement in FIG. 5 depicts only one exhaust port (8) and exhaust valve (9), but additionally to the two intake ports described in FIG. 1, it has a third intake port (10).

Figure 6:
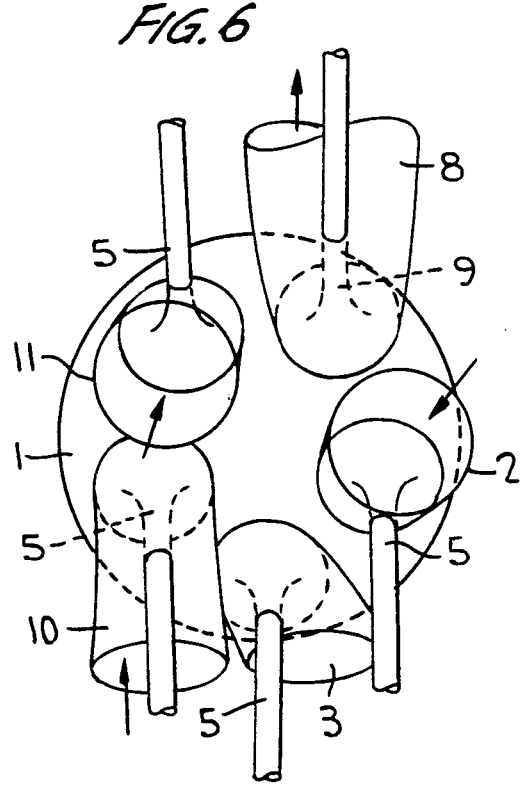

The arrangement in FIG. 6 has an additional fourth intake port (11) whereas the ports and their appertaining valves stand more tightly around the cylinder head, but in any case in such a way that the direction of the ports forces a clockwise whirl into the cylinder; meaning that the slanting ports join the cylinder head in the same circumferencial direction. The valves of the individual intake ports and the single exhaust port are positioned in two groups at an angle to each other, so that they can be activated by two camshafts.

With a multitude of intake ports, each port has a different sized cross-section in order to generate different gas speeds. The intake port which opens first at low rpm is highest gas flow speed. In the successively later opening intake ports the gas flow speeds are respectively slower, but the pressure is higher. This optimizes the gas flow into the cylinder at various piston stroke positions and stroke speeds and the gas swirl does not decelerate even at maximum piston stroke.

Summing up, a multivalve engine with specific directional intake ports can achieve an uninterrupted whirl in the cylinder, with a torque enhancing gas column adjustment, also long valve overlapping timings as well as relatively short valves; all of which result in an optimum fuel carburation by way of an individual throttle and fuel injection for each intake port, besides a largest possible filling grade caused by long overlapping timings and an rpm-related regulation of the gas column mass; further an optimal quick and clean burn caused by the strong uniform turbulence throughout the torque range and furthermore a higher peak power with good torque characteristics by way of sequencing the port openings.

I claim:

1. A combustion engine with at least one exhaust valve and more than one inlet valve per cylinder, wherein a separate intake port is assigned to each inlet valve and each intake port is controlled by a individual air throttle and fuel supply, wherein of the multiple separate intake ports at least one port joins the cylinder-head from the top and at least one port joins in an angle from the side; whereby every further port joining either from the top of from the side is positioned in the same circumferential direction so that a continuous unidirectional gas whirl is achieved in the cylinder.

2. A method of operating a combustion engine which includes at least one exhaust valve and more than one inlet valve per cylinder, an intake port for each inlet valve, said intake ports having differing diameters, an individual air throttle and fuel supply for each intake port, at least one intake port joining the cylinder head from the top and at least one intake port joining the cylinder head at an angle from the side, each further intake port joining either from the top or the side and being positioned in the same circumferential direction so that a continuous unidirectional gas flow can be achieved in the cylinder, the method including opening the air throttle of only one intake port at low rpm, and gradually opening at set timings the throttles of the other intake ports with rising rpm, the intake port which is furthest from the exhaust valve being opened first, the diametrically different sized intake ports which generate different gas speeds being opened successively.

3. A method according to claim 2, wherein the engine is operated with different overlapping valve timings between intake and exhaust, whereby the first opening inlet valve has a longer overlapping time with the furthest positioned, latest closing exhaust valve than the other inlet valves.

* * * * *

UNITED STATES PATENT AND TRADEMARK OFFICE
CERTIFICATE OF CORRECTION

PATENT NO. : 5,056,486

DATED : October 15, 1991

INVENTOR(S) : Nicholas J. JOHANNES

It is certified that error appears in the above-identified patent and that said Letters Patent is hereby corrected as shown below:

On the title page:

[86] PCT No.: PCT/CH89/00184

§371 Date: July 18, 1990

§102 (e) Date: July 18, 1990

Signed and Sealed this

Sixteenth Day of February, 1993

Attest:

STEPHEN G. KUNIN

Attesting Officer     Acting Commissioner of Patents and Trademarks